(12) United States Patent
Xu

(10) Patent No.: US 12,006,267 B2
(45) Date of Patent: Jun. 11, 2024

(54) CERAMIC COMPOSITES AND METHODS OF MAKING AND USING THE SAME

(71) Applicant: North Carolina State University, Raleigh, NC (US)

(72) Inventor: Chengying Xu, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 221 days.

(21) Appl. No.: 17/490,164

(22) Filed: Sep. 30, 2021

(65) Prior Publication Data

US 2022/0119316 A1    Apr. 21, 2022

Related U.S. Application Data

(60) Provisional application No. 63/093,507, filed on Oct. 19, 2020.

(51) Int. Cl.
C04B 35/626 (2006.01)
C04B 35/571 (2006.01)
C04B 35/589 (2006.01)

(52) U.S. Cl.
CPC ........ *C04B 35/6267* (2013.01); *C04B 35/571* (2013.01); *C04B 35/589* (2013.01); *C04B 35/62615* (2013.01); *C04B 35/6268* (2013.01); *C04B 35/6269* (2013.01); *C04B 2235/3813* (2013.01); *C04B 2235/483* (2013.01); *C04B 2235/5454* (2013.01); *C04B 2235/656* (2013.01); *C04B 2235/96* (2013.01)

(58) Field of Classification Search
None
See application file for complete search history.

(56) References Cited

U.S. PATENT DOCUMENTS

2017/0342549 A1* 11/2017 Kashyap ............... C04B 35/571

* cited by examiner

*Primary Examiner* — Jeffrey D Washville
(74) *Attorney, Agent, or Firm* — THOMAS | HORSTEMEYER, LLP

(57) ABSTRACT

The present disclosure provides for ceramic composite materials and methods of making ceramic composite materials. In an aspect, the ceramic composite materials can be made of polymer derived ceramics (PDCs) as the matrix, while substrates can be used as the microwave absorbing phases.

20 Claims, 8 Drawing Sheets

CERAMIC COMPOSITES AND METHODS OF MAKING AND USING THE SAME

CLAIM OF PRIORITY TO RELATED APPLICATION

This application claims priority to U.S. provisional application entitled "CERAMIC COMPOSITES AND METHODS OF MAKING AND USING THE SAME" having Ser. No. 63/093,507, filed on Oct. 19, 2021, which is entirely incorporated herein by reference.

BACKGROUND

High performance microwave absorbing materials are highly desired for aerospace applications such as aircraft engine nozzles and their aerodynamically heated parts. These materials are used for aircraft safety and high precision electronic apparatus by converting electromagnetic energy to thermal energy. Designing a material system for such applications is always challenging, because these harsh environment applications require the materials to withstand high-temperature oxidation while maintaining good microwave absorption property. Thus, there is a need to materials to meet these demands.

SUMMARY

The present disclosure provides for ceramic composite materials and methods of making ceramic composite materials. In an aspect, the ceramic composite materials can be made of polymer derived ceramics (PDCs) as the matrix, while substrates can be used as the microwave absorbing phases.

In one aspect, the present disclosure provides for ceramic composite materials comprising: a matrix comprising a polymer-derived ceramic; one or more of substrates selected from: an ultra-high temperature ceramic (UHTC), carbon, an electrically-conductive material, magnetic-conductive material, and a combination of these; and optionally, an oxide on surface of at least one of the substrates, wherein the oxide is derived from the aforementioned substrates.

In one aspect, the present disclosure provides for methods of forming a ceramic composite comprising: a) providing a mixture comprising: 1) a liquid preceramic precursor, and 2) one or more substrates, wherein the one or more substrates is selected from a solid substrate, a liquid substrate, or both the solid substrate and the liquid substrate, wherein the solid substrates and liquid substrates are independently selected from the group consisting of: an ultra-high temperature ceramic (UHTC), carbon, an electrically-conductive material, magnetic-conductive material, and a combination of these, b) heating the mixture at a temperature for a time effective to cure the liquid preceramic precursor to form a solid mixture; c) optionally subjecting the solid mixture to one or more forces to form particles of the solid mixture; d) optionally pressing the particles of the solid mixture into a mold having a pre-selected shape to form compacts of the solid mixture; e) pyrolyzing the solid mixture in step (b) or the compacts in step (d) or both at a temperature for a time effective to form the ceramic composite material.

BRIEF DESCRIPTION OF THE DRAWINGS

(FIG. 2H) XPS analysis of the $ZrB_2$ nano particles. Optical photographs of the pressed nano $ZrB_2$ pellet before (FIG. 2I) and after (FIG. 2K) heat treated at 1000° C. in Ar for 3 h. (L FIG. 2) is the cross section of the sample shown in (FIG. 2K). (FIG. 2M) XRD analysis of the heat treated (in Ar) $ZrB_2$ pellet surface and after the surface was polished.

(FIG. 3A) Optical photographs of the representative samples before (P0, P1, and P5) and after pyrolysis (NL0, NL1, and NL5), the rectangular prism sample is used for microwave scattering parameter test. (FIG. 3B) XRD results of the NL0, NL20, NL30 and NL50 samples. (FIG. 3C) XPS results of the Zr 3d components from the NL15 sample. (FIGS. 3D-L) SEM images of the PDC-UHTC composites with the normalized weight fractions of $ZrB_2$ nano particles less than 10%.

FIGS. 4A-K illustrate TEM observation and EDS analysis of the PDC-UHTC composites with the normalized weight fractions of $ZrB_2$ nano particles from 15% to 50% (FIGS. 4A-B) 15%, (FIGS. 4C-F) 30%, (FIGS. 4G, H) the Fast Fourier Transform (FFT) of the area A and B, (FIGS. 4I-K) 40%, (FIG. 4L, 4M) EDS mapping of (FIG. 4K), (FIGS. 4N-4P) 50%.

(FIG. 5A) Raman spectrum and (FIG. 5B) TEM image of SiOC the matrix (Inset is the FFT of Figure (FIG. 5B)). (FIG. 5C) DC conductivity of the samples as a function of the normalized weight fraction of $ZrB_2$ nano particles.

(FIG. 8E) Microwave absorption bandwidth of ceramic based composites from literature review.

DETAILED DESCRIPTION

Figure 1:
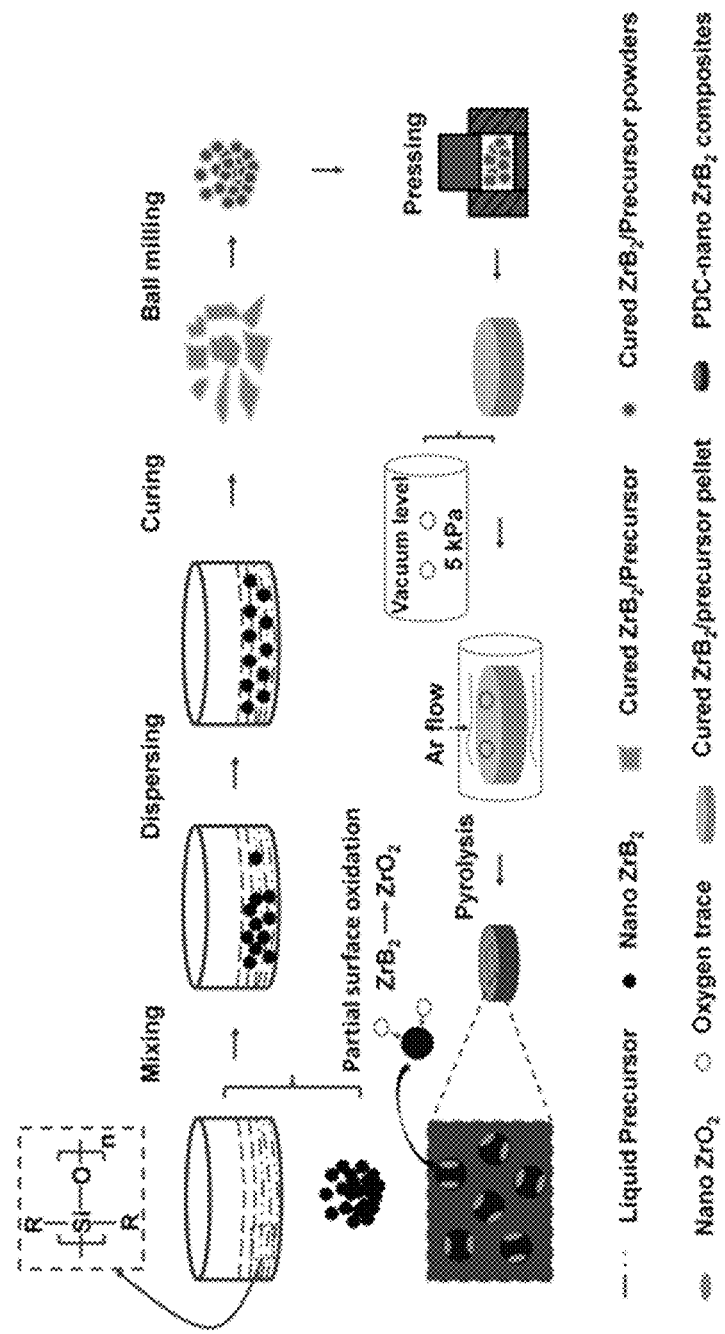
FIG. 1 shows an illustration of the fabrication process of the nano composites.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of" Similarly, the term "consisting essentially of" is intended to include examples encompassed by the term "consisting of.

As used in the specification and the appended claims, the singular forms "a," "an" and "the" include plural referents unless the context clearly dictates otherwise.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 0.5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

Discussion

Embodiments of the present disclosure provide for ceramic composite materials (as referred to as "high temperature microwave absorbing ceramic composite") and methods of making ceramic composite materials. In an aspect, the ceramic composite materials can be made of polymer derived ceramics (PDCs) as the matrix, while substrates (e.g., in-situ partially surface-oxidized ultra-high temperature ceramics (UHTCs) nano particles, for example) can be used as the microwave absorbing phases. In an aspect, the fabricated high temperature microwave absorbing ceramic composite has a significantly wide absorption bandwidth of 13.5 GHz covering the entire Ka-band (26.5-40 GHz) and a minimum reflection coefficient (RC) of −29.30 dB at a thickness as 1.26 mm. Such properties are provided by the extensive nano interfaces introduced within the ceramic composite material and the electrical conduction loss provided by the UHTC ($ZrB_2$) substrates. The excellent microwave absorption properties make the ceramic composite materials an ideal microwave absorption material choice for high-temperature harsh environment applications.

In an embodiment, the present disclosure provided for methods of forming ceramic composite materials. The method can include providing a mixture that includes a liquid preceramic precursor and one or more substrates. The ratio of the liquid preceramic precursor to the one or more substrates can be about 10000:1 to 1:10000, about 1000:1 to 1:1000, about 500:1 to 1:500, about 250:1 to 1:250, about 100:1 to 1:100, about 50:1 to 1:50, about 20:1 to 1:20, about 10:1 to 1:10, about 5:1 to 1:5, about 2.5:1 to 1:2.5, or about 1:1. One or more substrates can be a solid substrate, a liquid substrate, or both the solid substrate and the liquid substrate. For example, the one or more substrates can include one or more types of solid substrates and/or one or more types of liquid substrates. The liquid preceramic precursor forms the PDC or the matrix for which the substrates are within. Additional details regarding the one or more substrates is provided below and herein.

Next the mixture is heating a temperature for a time effective (e.g., about 5 min to 60 min, about 1 hour to 10 hours, about 1 hour to 5 hours, about 1 hour to 12 hours, about 2 hours to 24 hours, about 1 day to 1 week, etc.) to cure the liquid preceramic precursor to form a solid mixture. Heating the mixture can be performed at about 100-400° C. or about 110-200° C. In an aspect, in reference to the solid mixture, the normalized weight of one or more substrates is about 10-70% of the total weight of the solid mixture or about 30-40% of the total weight of the solid mixture.

Optionally, the solid mixture is subjected to one or more forces to form particles of the solid mixture. The one or more forces can include compressing the solid mixture, grinding the solid mixture, or a combination thereof. Grinding of the solid mixture can include ball milling the solid mixture, for example.

Optionally, the particles of the solid mixture can be pressed into a mold having a pre-selected shape to form compacts of the solid mixture. The pre-selected shape can be one of a particle, a fiber, a whisker, a flake, a mat, or a plate.

The solid mixture (or the compacts if they are formed) is pyrolyzed at a temperature for a time effective (e.g., about 5 min to 60 min, about 1 hour to 10 hours, about 1 hour to 5 hours, about 1 hour to 12 hours, about 2 hours to 24 hours, about 1 day to 1 week, etc.) to form the ceramic composite material. Pyrolyzation can be at about 400-2000° C., about 800-1000° C., or about 1100° C. Additional details regarding the methods of making the ceramic composite material are provided in Example 1.

Now having described methods of making the ceramic composite material, additional details are provided. The present disclosure provides for different types of ceramic composite materials, where the ceramic composite material can be formed used the methods described herein.

Referring to both the methods described above and the ceramic composite material, the solid substrate can include one or more of an ultra-high temperature ceramic (UHTC), carbon, an electrically-conductive material, magnetic-conductive material, and a combination of these. In as aspect, the liquid substrate can include one or more of an ultra-high temperature ceramic (UHTC), carbon, an electrically-conductive material, magnetic-conductive material, and a combination of these.

Once the material is produced, the ceramic composite materials can include a matrix having a polymer-derived ceramic and one or more of types of substrates. In an aspect, the substrates can be an ultra-high temperature ceramic (UHTC), carbon, an electrically-conductive material, magnetic-conductive material, or a combination of these (e.g., such as those produced from the solid substrate and/or liquid substrates described in the methods). In an aspect, the mixture can optionally include an oxide on the surface of one or more of the substrates, where the oxide is derived from the substrates. The ceramic composite material can have a microwave absorption bandwidth. For example, the microwave absorption bandwidth can be S-band C-band, X-band, Ku-band, K-band, Ka-band, V-band, or W-band.

Each individual solid substrate can be in the form of a particle, a fiber, a whisker, a flake, a mat, or a plate. For example, a portion of the solid substrates can be in the form of particles while another portion can be in the form of whiskers, where the solid substrates can be of the same or different types of material.

Each individual liquid substrate can be a precursor liquid, a gel, or a paste. For example, a portion of the liquid substrates can be in the form of gel while another portion can be in the form of a paste, where the liquid substrates can be of the same or different types of material.

The carbon can be carbon particles, graphite, graphene, carbon nanotube, fullerene, diamond, or another form of carbon. The electrically-conductive material can be copper, aluminum, magnesium, silver, gold, molybdenum, zinc, lithium, brass, platinum, tungsten, tin, lead, or titanium, or another transition metal. When present, mixture can include an oxide of copper, aluminum, magnesium, silver, gold, molybdenum, zinc, lithium, brass, platinum, tungsten, tin, lead, or titanium, or another transition metal. The magnetic-conductive materials can be iron, steel, nickel, cobalt, or a rare earth metal. When present, mixture can include an oxide of iron, steel, nickel, cobalt, or a rare earth metal.

The ultra-high temperature ceramic substrates can be made of boride, a carbide, a nitride, or a combination thereof. When present, mixture can include an oxide of boride, a carbide, a nitride, or a combination thereof. The ultra-high temperature ceramic substrates can be $HfB_2$, $ZrB_2$, $TiB_2$, $NbB_2$, $TaB_2$, TaC, HfC, ZrC, NbC, TiC, TaN, HfN, TiN, ZrN, NbN, or a combination thereof. When present, the mixture can include an oxide of $HfB_2$, $ZrB_2$, $TiB_2$, $NbB_2$, $TaB_2$, TaC, HfC, ZrC, NbC, TiC, TaN, HfN, TiN, ZrN, or NbN. In an aspect, the ultra-high temperature ceramic substrates can include $HfB_2$, $ZrB_2$, $TiB_2$, $NbB_2$, $TaB_2$, or a combination thereof. In another aspect, the ultra-high temperature ceramic substrates can be TaC, HfC, ZrC, NbC, TiC, or a combination thereof. In another aspect, the ultra-high temperature ceramic substrates can be TaN, HfN, TiN, ZrN, NbN, or a combination thereof. In an aspect, the ultra-high temperature ceramic substrates can be $ZrB_2$, and optionally the oxide is $ZrO_2$. In an aspect, the ultra-high temperature ceramic substrates can be $TfB_2$, and optionally the oxide is $TfO_2$.

As used herein, the phrase "liquid preceramic precursor" generally includes any material that may be converted to a ceramic upon heating. In some embodiments, the liquid preceramic precursor includes a polymer. The liquid preceramic precursor can be an organosilicon polymer. The polymer-derived ceramic can be derived from an organosilicon polymer. In an embodiment, the polymer includes an organosilicon polymer. The organosilicon polymer may be selected from a polysiloxane, a polysilsesquioxane, a polycarbosiloxane, a polycarbosilane, a polysilylcarbodiimide, a polysilsesquicarbodiimide, a polysilsesquiazane, a polysilazane, a polyborosilazane, a polyborosilane, a polyborosiloxane, or a combination thereof. In an aspect, the liquid preceramic precursor can be a polysilanes, polycarbosilanes, polysilazanes, polysiloxanes, polycarbosilanes, polycarbosiloxanes, polysilylcarbodiimides, and a combination thereof. In some embodiments, the polymer includes polycarbosilane.

The matrix of the ceramic composite materials, excluding the substrates, provided herein includes a polymer-derived ceramic (PDC) (e.g., organosilicon derived ceramic). The phrase "polymer-derived ceramic" (i.e., "PDC"), as used herein, refers to a ceramic material formed via the thermal decomposition of a polymeric precursor. The PDC may be created by the thermal decomposition of polymeric liquid preceramic precursor as described herein. In some embodiments, the PDC material of the ceramic composite materials described herein includes $SbN_4$, SiC, BN, AlN, SiCN, SiCO, BCN, SiCNO, SiBCN, SiBCO, SiAlCN, SiAlCO, or a combination thereof. As described herein, the ceramic composite material includes the PDC and the substrates.

The normalized weight of one or more substrates (e.g., derived from the solid substrates, liquid substrates, or a combination thereof) can be about 10-70% of the total weight of the ceramic composite material or about 30-40% of the total weight of the ceramic composite material. The normalized weight of PDC can be about 30-90% of the total weight of the ceramic composite material or about 60-70% of the total weight of the ceramic composite material.

Example

Microwave absorbing materials in high-temperature harsh environment are highly desired for electronics and aerospace applications. This Example reports a novel high-temperature microwave absorbing ceramic composites made of polymer derived ceramics (PDCs) and in-situ partially surface-oxidized ultra-high temperature ceramic (UHTC) $ZrB_2$ nano particles. The fabricated composite with a normalized weight fraction of $ZrB_2$ nano particles at 40% has a significantly wide microwave absorption bandwidth of 13.5 GHz (26.5-40 GHz) covering the entire Ka-band. This is attributed to the extensive nano interfaces introduced in the composites and the electronic conduction loss provided by the $ZrB_2$ nano particles. The minimum reflection coefficient (RC) was −29.30 dB at 29.47 GHz for a thickness of 1.26 mm. The DC conductivity of the nano composites showed a clear percolation phenomenon as the normalized weight fraction of $ZrB_2$ nano particles increases to 30%. The results provide new insights in designing microwave absorption materials with a wide absorbing frequency range and strong absorbing loss for high-temperature harsh environment applications.

High performance microwave absorbing materials are highly desired for aerospace applications such as aircraft engine nozzles and their aerodynamically heated parts. These materials are used for aircraft safety and high precision electronic apparatus by converting electromagnetic energy to thermal energy.[1-4] Designing a material system for such applications is always challenging, because these harsh environment applications require the materials to withstand high-temperature oxidation while maintaining good microwave absorption property. Suitable material choices are confined to ceramics,[3-13] or ceramic composites such as oxide-based ($SiO_2$,[13-18] $ZrO_2$[19, 20]), polymer derived ceramic (PDC) based,[21-27] $SiC$,[28, 29] $SiCN$,[30] and $Si_3N_4$[31, 32]. Conventional carbon[33] and metal/polymer composites are not applicable in such environments due to oxidation. Among all ceramic composites, PDCs are one of the most effective matrix materials for high temperature microwave absorption, thanks to their low processing temperature, good oxidation resistance at high temperature and flexibility in design and manufacturing.[34-38] Existing microwave absorbers in such PDC-based composite systems for microwave radiation suppression are mainly focused on free carbon, SiC nanowires (NWs),[23, 39] carbon nanotubes (CNTs),[40, 41] graphene,[2, 42, 43] $Ti_3C_2T_x$,[44, 45] $HfC_xN_{1-x}/C$[28] or C/SiC,[29] which are mostly carbon dependent and will lose their attenuation capacity at high temperature oxidative environments. Additionally, the absorption band of such system is usually narrow and is lack of capability in meeting the stringent requirement for high performance broadband microwave absorption. New absorber materials with excellent oxidation resistance and advanced structure [46-48] are highly desired.

Ultra-high temperature ceramics (UHTCs), represented by $ZrB_2$ and $HfB_2$, have high melting points, high-temperature mechanical property retention, excellent corrosion resistance, and good oxidation resistance due to passivation by refractory surface oxides.[49-51] The refractory oxides formed on their surfaces, $ZrO_2$ and $HfO_2$, are thermally more stable than those of the MXene phase (e.g., $Ti_3SiC_2$ and $Ti_3AlC_2$) and other Si-based ceramics. Incorporation of $ZrB_2$ and $HfB_2$ phases can significantly improve the oxidation resistance and the thermal stability of Si-based materials.[52-54] The most attractive property of $ZrB_2$ and $HfB_2$ is their high electrical conductivity (~107 S/m),[50, 55] which provides the capability in designing multi-functional microwave absorbing materials for high temperature harsh environment applications. Based on these significant merits, nano $ZrB_2$ is used in this work to serve as the microwave absorber, because of its high electrical conductivity and high temperature stability, as well as the interfaces introduced in the material system which provides additional capability of further dissipating the microwave energy.

In a filler system, the controllable electrical conductivity is important to guarantee sufficient conductive loss, and at the same time, a suitable dielectric constant of the composites is necessary to facilitate the impingement of the electromagnetic wave for absorption. Note that a highly conductive filler always has a percolation point of electrical conductivity, around which the electrical conductivity abruptly changes, resulting in an un-tunable dielectric constant of the system for microwave absorption. In the fabrication process, the nano $ZrB_2$ surface was partially oxidized by oxygen trace, and therefore, the dielectric constant of the system is tunable to match the free space. Additionally, the oxidation interfaces provide numerous interfaces in the material system, which makes the broadband and strong absorption of the incoming microwave.

The present disclosure provides a method to fabricate a novel high temperature microwave absorbing ceramic composite made of polymer derived ceramics (PDCs) as the matrix, while in-situ partially surface-oxidized ultra-high temperature ceramics (UHTCs) nano particles as the microwave absorbing phases. The fabricated nano composites have a significantly wide absorption bandwidth of 13.5 GHz covering the entire Ka-band (26.5-40 GHz) and a minimum reflection coefficient (RC) of −29.30 dB at a thickness as 1.26 mm. Such properties are provided by the extensive nano interfaces introduced within the nano composites and the electrical conduction loss provided by the UHTC ($ZrB_2$) nano particles. A series of tests were conducted to investigate the structural and morphological advantages of the novel nano composite for microwave attenuation. Results of this work provide a new solution in adjusting the electrical conductivity and designing high temperature microwave absorbing materials.

Results and Discussion

FIG. 1 illustrates the fabrication process of the nano composites (with PDC as the matrix, while nano $ZrB_2$ particles and nano $ZrO_2$ are the fillers. The encapsulation of nano $ZrB_2$ particles in the pre-ceramic polymer precursor was achieved by first dispersing the $ZrB_2$ particles in the as-received liquid polymer precursor, followed by curing and cross-linking into the solid state. The mixtures were then ball milled into powders and pressed into pellets. Finally, the compacts were pyrolyzed into PDC-UHTC nano-$ZrB_2$ composites. During this process, nano $ZrO_2$ was also formed on the surfaces of $ZrB_2$ nano particles. (Note: Cured samples with normalized weight fractions of $ZrB_2$ nano particles at 0%, 1%, . . . , 40%, 45%, and 50% are marked as P0, P1, . . . , P40, P45, P50. Ceramic samples with normalized weight fractions of $ZrB_2$ nano particles at 0%, 1%, . . . , 40%, 45%, and 50% are marked as NL0, NL1, . . . , NL40, NL45, NL50).

Figures 2A, 2B, 2C, 2D, 2E, 2F, 2G, 2H, 2I, 2J, 2K, 2L, 2M:
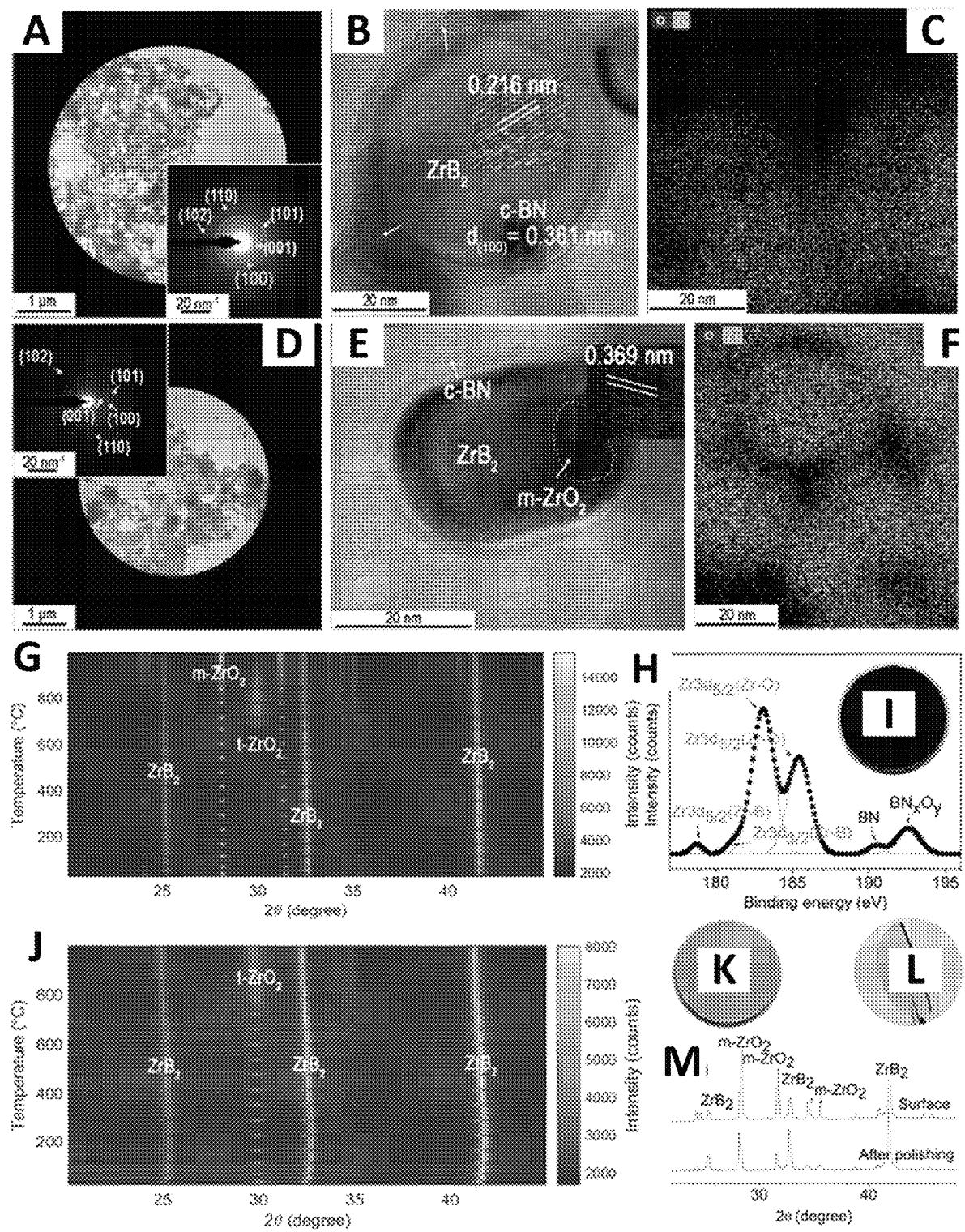
FIGS. 2A-2M illustrate the characterization of the nano $ZrB_2$ particles. Selected area electron diffraction (SAED) (FIG. 2A), TEM image (FIG. 2B) and EDS analysis (FIG. 2C) of the as-received $ZrB_2$ nano particles. Selected area electron diffraction (FIG. 2D), TEM image (FIG. 2E) and EDS analysis (FIG. 2F) of the pressed $ZrB_2$ nano particles heat treated at 1000° C. in Ar for 3 h (the TEM sample was obtained after polishing the surface). High temperature in-situ XRD (from room temperature to 1000° C. in He) analysis of the pressed nano $ZrB_2$ pellet (FIG. 2J) and the cured precursor with normalized weight fraction of $ZrB_2$ nano particles at 40% (P40).

Knowing the properties of $ZrB_2$ nano particles is important in this Example. FIGS. 2A and 2B are the TEM analysis of the as-received $ZrB_2$ nano particles. The selected area electron diffraction reveals that the particles are mainly nano $ZrB_2$. The TEM image (FIG. 2B) indicates that the $ZrB_2$ nano particles are coated with an amorphous layer and a c-BN thin layer at the outmost.[56] EDS analysis (FIG. 2C) shows that the amorphous layer contains element 0. XPS spectra was used to characterize the surface layer of the samples. FIG. 2H shows the signatures of the Zr 3d components. The peak locations of Zr3d5/2 and Zr 3d3/2 peak at 178.7 eV and 181.2 eV are attributed to the Zr—B bonds.[57] The peak locations of Zr 3d5/2 and Zr 3d3/2 at approximately 183.1 eV and 185.4 eV are the characteristics of the O—Zr bonds.[57] XPS analysis of the $ZrB_2$ nano particles indicates that intermediate amorphous layer is composed of $ZrO_2$ and $BN/BN_xO_y$.[52]

In order to investigate the effect of heat treatment on the composition change during the pyrolysis, the $ZrB_2$ nano particles were pressed into pellets and then were heat treated at 1000° C. in Ar for 3 h. After removing the surface, the heat treated pellets were crushed into powders and subjected to TEM observation. The selected area electron diffraction, the TEM image and the EDS analysis of the heat treated $ZrB_2$ nano particles are shown in FIGS. 2D-2F. After heat treatment, the composition of the $ZrB_2$ nano particles is similar to that of the as-received nano particles. The amorphous layer and the c-BN phase are still present at the outer shell of the nano particles. Because of the high activity of the nano $ZrB_2$, m-$ZrO_2$ may be formed due to the reaction between $ZrB_2$ and the oxygen trace in the fabrication environment during the heat treatment at high temperatures, as illustrated in the TEM image (FIG. 2E). To further analyze the formation of the $ZrO_2$, the high temperature in-situ XRD was conducted on the $ZrB_2$ pellet in He up to 1000° C. As illustrated in FIG. 2J, small m-$ZrO_2$ peaks exist in the raw $ZrB_2$ particles and it is evident that t-$ZrO_2$ forms at around 674° C. Since m-t phase transition of $ZrO_2$ always occurs around 1000° C., these t-$ZrO_2$ signatures should represent the newly-formed phases during the heat treatment. Crystallization of the amorphous $ZrO_2$ and oxidation by the oxygen trace in the ambient environment are the possible reasons for the formation of t-$ZrO_2$. However, after the heat treatment, the surface of the pressed $ZrB_2$ pellet becomes white (FIG. 2K), while the interior of the sample is still black, as illustrated by the cross section of the sample (FIG. 2L). XRD analysis of the heat treated $ZrB_2$ pellet after polishing the surface reveals that the ratio between $I_{m-Zr,O_2(-111)}$ and $I_{ZrB_2(101)}$ decreases from 1.09 to 0.51 compared to that without polishing (FIG. 2M), indicating that the sample surface is more sensitive to form $ZrO_2$. The high temperature in-situ XRD of the cured precursor with normalized weight fraction of $ZrB_2$ nano particles at 40% (P40) only reveals t-$ZrO_2$, because the nano $ZrB_2$ particles are encapsulated by the PDC matrix, which reduces the oxidation rate by the possible oxygen trace during the XRD measurement.

Figures 3A, 3B, 3C, 3D, 3E, 3F, 3G, 3H, 3I, 3J, 3K, 3L:
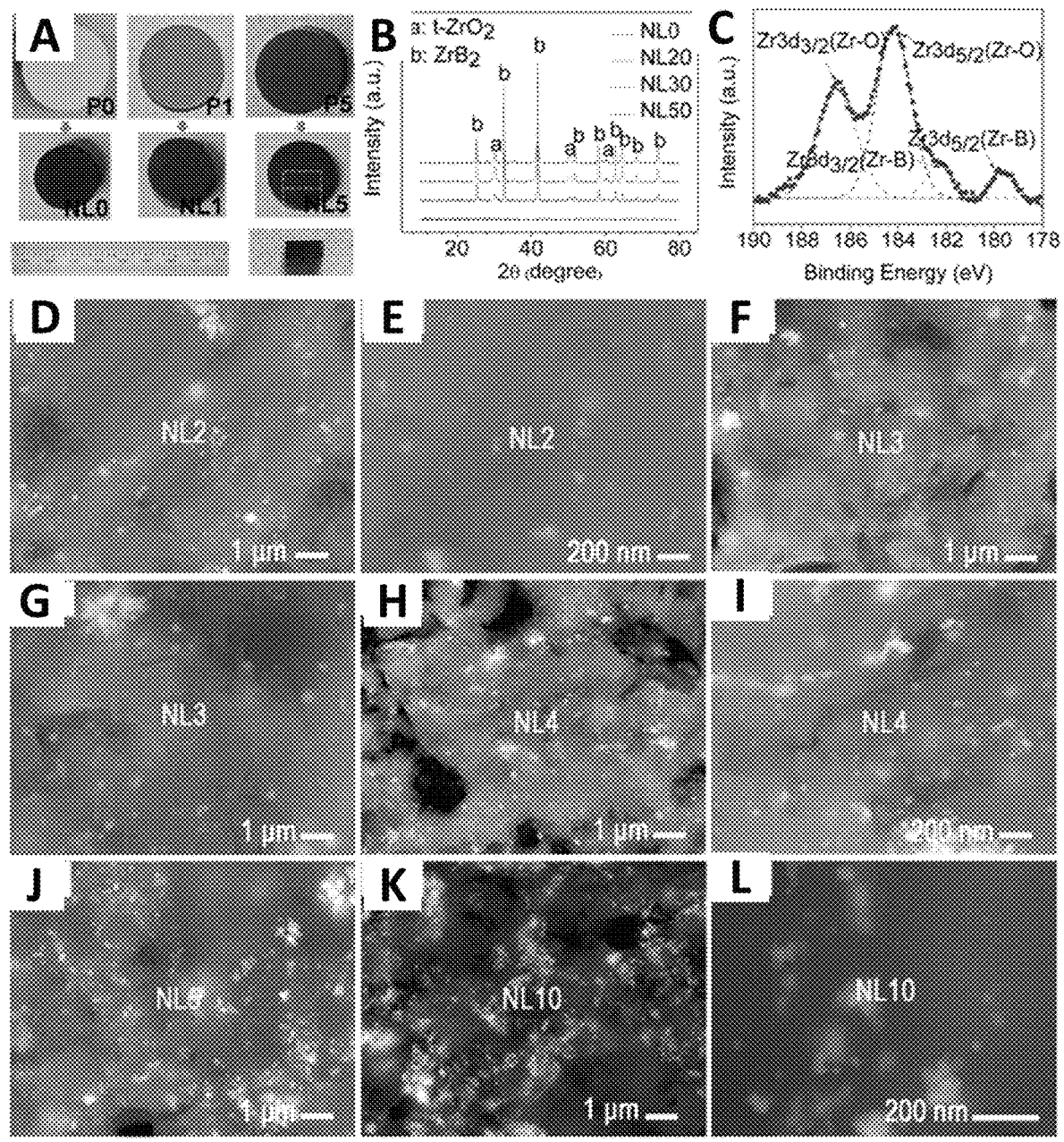
FIGS. 3A-3L illustrate.

Optical photographs of representative samples before pyrolysis (P0, P1, and P5) and after pyrolysis (NL0, NL1 and NL5) are shown in FIG. 3A. The cured pristine pre-ceramic polymer precursor (P0) is light green in color, and the cured samples with $ZrB_2$ inclusions are darker (P1 an d P5). All the samples became dark bluish after pyrolysis (NL0, NL1, and NL5).

XRD analysis results of the nano composites (NL0, NL20, NL30, NL50) are shown in FIG. 3B. The pristine PDC sample (NL0) is at amorphous state without any detectable peak. Amorphous pristine PDC is good for microwave transmission. In all of the fabricated nano composites, except for the peaks for $ZrB_2$, peaks for t-$ZrO_2$ are also detected (including the (101) peak around 2Θ value of 30.30, the (112) peak around 2θ value of 50.15, and the (211) peak around 2Θ value of 60.20), indicating the existence of t-$ZrO_2$ within the samples. The formation of $ZrO_2$ in the nano composites was also verified by the XPS analysis result of the samples (FIG. 3C).

The nano $ZrO_2$ within the nano $ZrB_2$ particles forms during the transformation from precursor to ceramic other than other process during fabrication, such as curing and ball milling.[58] We conducted four sets of experiments to illustrate the formation of nano $ZrO_2$ during the precursor to ceramic transformation, suggesting that $ZrO_2$ was formed during the pyrolysis of the samples under high temperatures, which is consistent with previous analysis results for the as-received $ZrB_2$ nano particles.

The distribution of nano $ZrB_2$ particles in the PDC matrix with low normalized weight fractions of $ZrB_2$ nano particles (below 10%) was investigated by the SEM observation, as shown in FIG. 3A-3L. The overall distribution of nano $ZrB_2$ particles is nearly uniform when the normalized weight fractions of $ZrB_2$ nano particles are below 4%, except for some agglomerated nano $ZrB_2$. Interestingly, the nano particles get lined-up as the normalized weight fractions of $ZrB_2$ nano particles increase to above 4%. However, in the zoom-in graph, the particles are not in contact with each other but are keeping a certain distance from each other. The distance between these lined-up nano particles is large, as seen from the higher magnification images of the PDC with the normalized weight fractions of $ZrB_2$ nano particles from 4% to 10% (FIGS. 3I and 3L). Therefore, the loaded $ZrB_2$ nano particles prefer to form quasi percolation paths first when the normalized weight fractions of $ZrB_2$ nano particles are low.

Figures 4A, 4P:
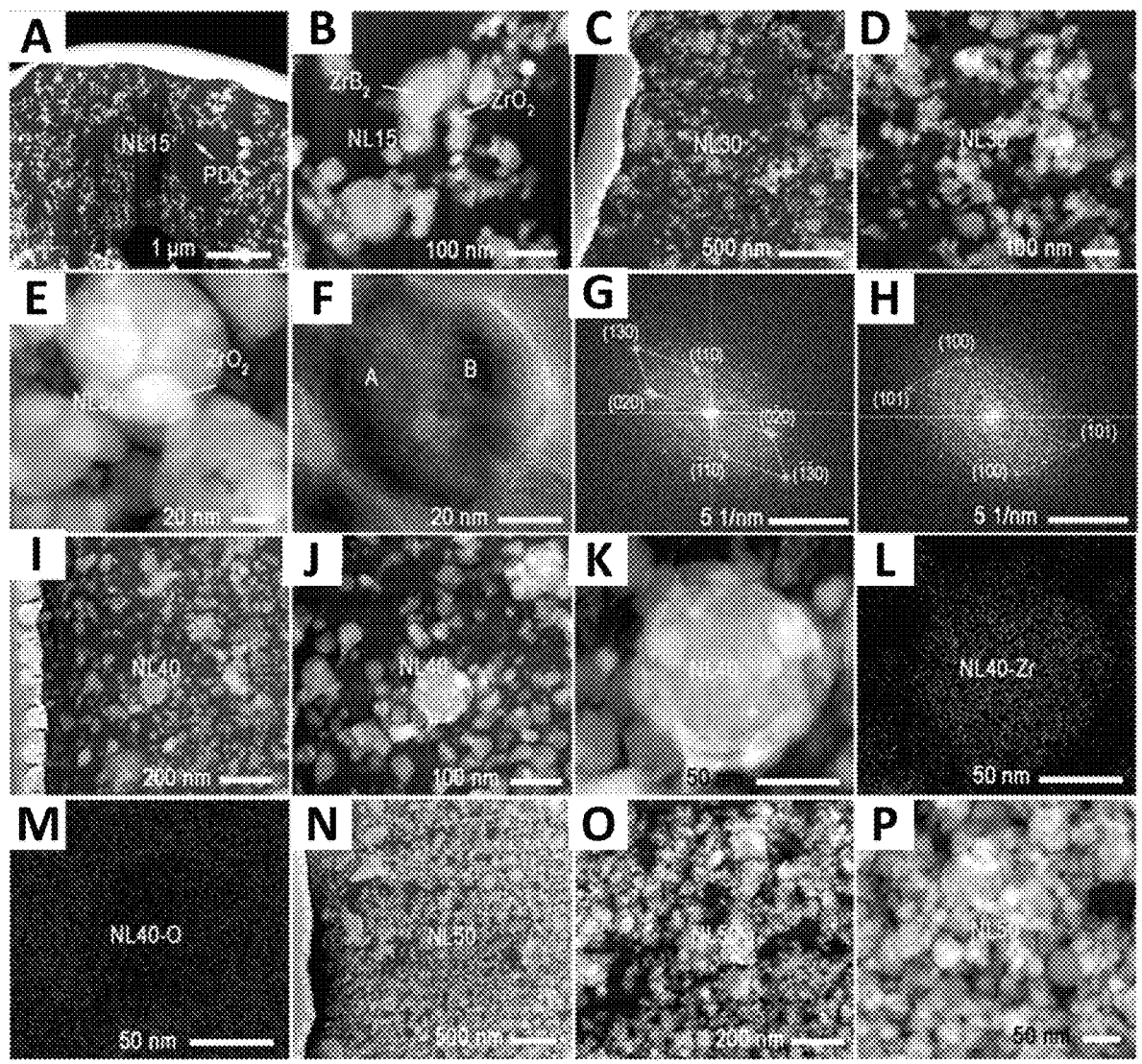

The distribution of the $ZrB_2$ nano particles in the PDC matrix with higher normalized weight fractions of $ZrB_2$ nano particles (15, 30, 40, 50%) was investigated by TEM, as shown in FIG. 4A-4P. Different from the observations from SEM shown in FIG. 3A-3L, when normalized weight fraction of $ZrB_2$ nano particles is 15%, the particles are in contact with each other in the lined-up paths. However, there is still some distance between each pair of the lined-up paths. As the normalized weight fraction of $ZrB_2$ nano particles increases to 30%, these lined-up paths contact end to end, as seen from FIGS. 4C and 4D. As the $ZrB_2$ content keeps increasing, the nano $ZrB_2$ particles start to form complete percolation paths, e.g., in the samples with the normalized weight fractions of $ZrB_2$ nano particles at 40 and 50% (FIGS. 4I, 4J, 4N, 4O, 4P).

The TEM observation also reveals the distribution of $ZrO_2$ in $ZrB_2$. The TEM analysis of the PDC-UHTC composites with the normalized weight fractions of $ZrB_2$ nano particles at 15% shows that $ZrO_2$ is mainly distributed on the surfaces of $ZrB_2$ nano particles (white spot in FIG. 4B). The verification of $ZrO_2$ is illustrated using the 30% samples, as seen from the high magnification figures focusing on one $ZrB_2$ nano particle under different TEM modes (FIGS. 4E and 4F). The Fast Fourier Transform (FFT) of the selected areas of $ZrO_2$ (FIG. 5G) and $ZrB_2$ (FIG. 4H) verifies that the white phases are $ZrO_2$. The distribution of $ZrO_2$ in the 40% sample is shown in FIG. 4I-4K. The EDS mapping of the particles are shown in FIG. 4L, 4M. Zr element distributes covering the entire $ZrB_2$ particles, while 0 element only exists on the outside of the particle. The presence of $ZrO_2$ on the surface of the $ZrB_2$ nano particles plays an important role on providing extensive nano interfaces and therefore contributing the electrical, dielectric and microwave absorption properties of the fabricated PDC-UHTC nano-composites.

Figures 5A, 5B, 5C:
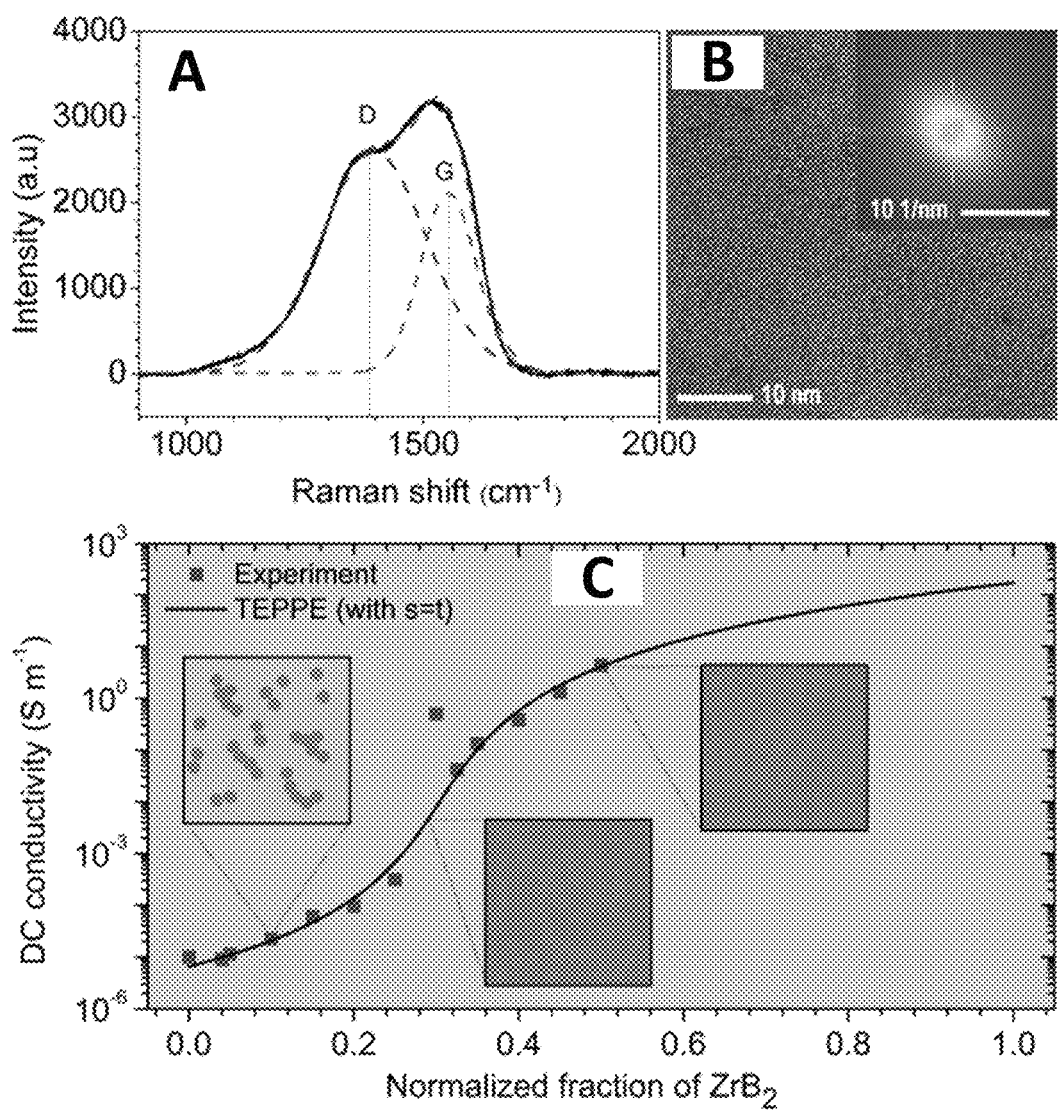
FIGS. 5A-5C illustrate.

To understand the electrical property of the nano-composites, the microstructure of the PDC matrix was investigated first. FIG. 5A shows the Raman spectrum of the pristine PDC matrix (sample was pyrolyzed at 1000° C. in Ar). Two peaks around 1390 cm$^{-1}$ and 1550 cm$^{-1}$, corresponding to $A_{1g}$ mode associated with amorphous carbon and $E_{2g}$ with graphite clearly show the existence of free carbon in the PDC matrix. The PDC in this work is composed of amorphous $SiO_2$ domain, amorphous SiC and free carbon.[59, 60] The TEM image of the PDC matrix is shown in FIG. 5B. Because of the low pyrolysis temperature, the SiOC is amorphous, as can be seen from the FFT shown in FIG. 5B. Free carbon cannot be seen clearly under such pyrolysis temperature. The conductivity of PDC SiOC is mainly due to sp$^2$ carbon (G) in the PDC matrix. The percolation network of free C has not been formed at the present pyrolysis temperature, which was proposed to form at a temperature above 1400° C.[59, 61] Therefore, the DC conductivity of PDC in this work is low and the electrical conductivity of the pristine matrix is lower than any other nano $ZrB_2$ contained samples. The amorphous state of PDC makes the matrix a transparent material with low microwave absorbing property.

The electrical property of the nano-composites determines the electrical conduction loss of the material. The change of electrical conductivity with the normalized weight fraction of $ZrB_2$ nano particles was plotted in FIG. 5C. The electrical conductivity of the nano composites with the normalized weight fractions of $ZrB_2$ nano particles less than 20% is slightly higher than that of the pristine PDC, which has an electrical conductivity magnitude of $10^{-6}$ S/m. From the experiment data, the electrical conductivity of the nano composites shows a rapid increase when the normalized weight fractions of $ZrB_2$ nano particles are higher than 25%, revealing a percolation behavior.[61] The electrical conductivity of the nano composites with the normalized weight fractions of $ZrB_2$ nano particles from 30% to 40% is around the magnitude of 1 S/m. To find the normalized percolation fraction, the electrical conductivity curve was fitted by the Single Exponent Phenomenological Percolation Equation (SEPPE, also known as the General Effective Medium Model (GEM)[62-65]).

$$(1-\varphi)(\kappa_1^{1/s}-\kappa_m^{1/s})(\kappa_1^{1/s}+A\kappa_m^{1/s})+(\varphi)(\kappa_h^{1/t}-\kappa_m^{1/t})/(\kappa_h^{1/t}+A\kappa_m^{1/t})=0 \quad (1)$$

where $A=(1-\varphi_c)/\varphi_c$, $\kappa_m$ is the conductivity of the nano composites, $\kappa_h$ the conductivity of the more conductive phase and $\kappa_1$ the conductivity of the PDC matrix. $\varphi_c$ is the normalized percolation threshold. The experiment data were well fitted by SEPPE (FIG. 5C), which results in a normalized $\varphi_c$ of 30.49% and almost consistent with the observation by the TEM (30%, FIG. 5A-5C). The fitted electrical conductivity of more conductive phase (170.96 S m$^{-1}$) is lower than that of $ZrB_2$ which has an electrical conductivity of 107 S m$^{-1}$.[55] The formation of $ZrO_2$ on the surface of $ZrB_2$ leads to a decrease in fitted electrical conductivity of more conductive phase. As illustrated in FIG. 5C, $ZrB_2$ particles form a percolation path for the electrical conduction at the percolation threshold. Below the percolation threshold, no electrical conduction path forms. Above the percolation threshold, percolation paths increase and the unfilled PDC decreases, resulting in a further increase of electrical conductivity. Formation of too many percolation paths will not cause sufficient electrical conduction loss of the bulk material although the DC conductivity measured using two side method is sufficiently high when the $ZrB_2$ loading further increases, because the microwave will be reflected by the material surface.

Figures 6A, 6B, 6C, 6D, 6E:
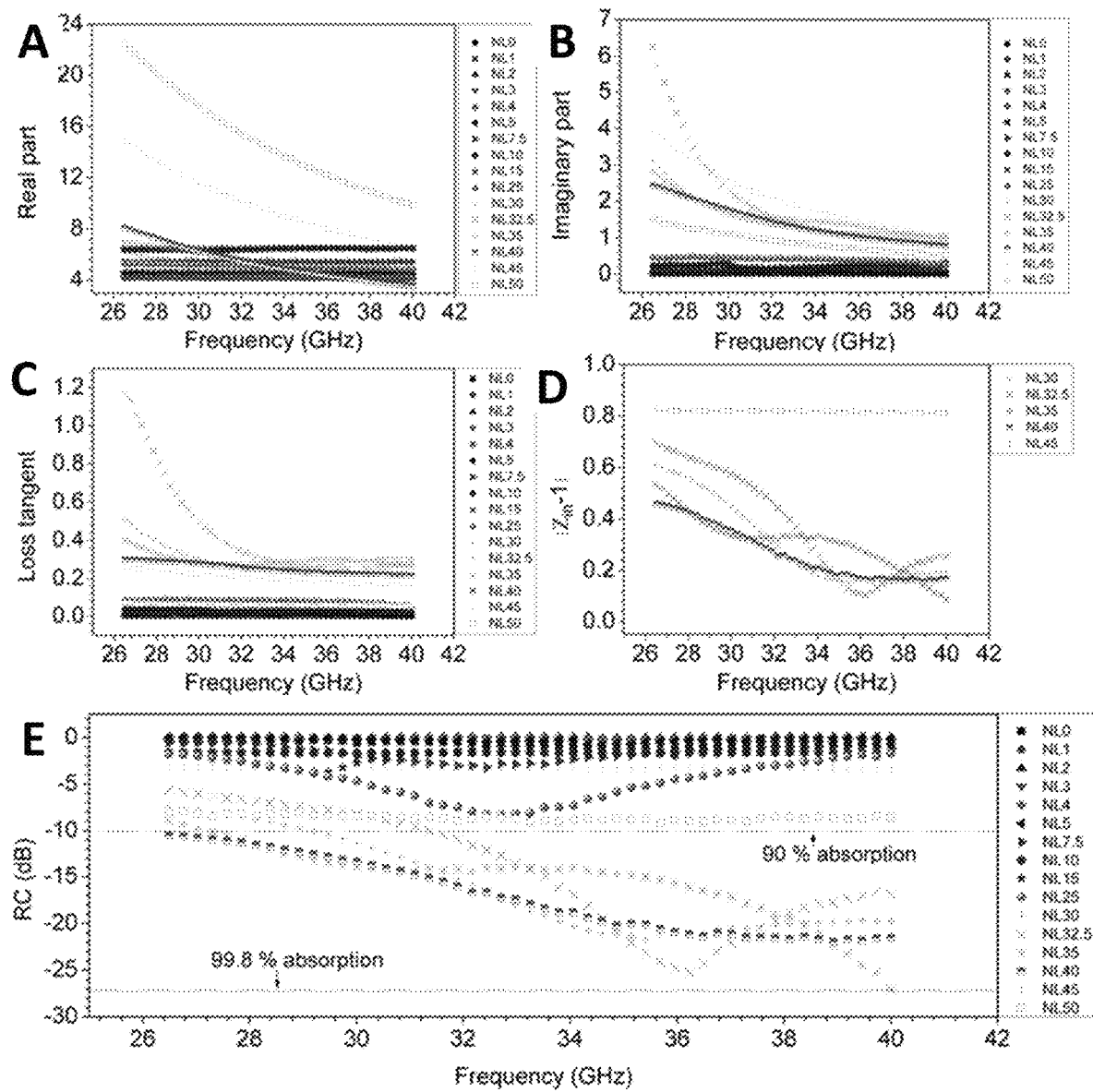
FIGS. 6A-6C illustrate the complex permittivity (FIGS. 6A, B), loss tangent (FIG. 6C), modulus of $(Z_{in}-1)$ (FIG. 6D) and RC (FIG. 6E) of the PDC-UHTC nano composites with various normalized weight fractions of $ZrB_2$ nano particles.

Microwave absorption property of the nano-composites is correlated with its complex permittivity. The complex permittivity of the samples with different normalized weight fractions of $ZrB_2$ nano particles is shown in FIG. 6A-6E. The average real ($\varepsilon'$) and imaginary ($\varepsilon''$) permittivity of the pristine PDC is 4.24 and 0.06 in Ka-band, respectively, which results in a low loss tangent. The low loss tangent suggests that the PDC matrix is a wave-transmitting material and therefore makes no contribution to the material loss of the nano composites. When the $ZrB_2$ loading increases, the permittivity of the nano composites changes, with an evident increase when the normalized weight fraction of $ZrB_2$ nano particles is higher than 10%. The average real and imaginary permittivity of the nano composites increase to 5.39 and 1.40, respectively, when the normalized weight fraction of $ZrB_2$ nano particles increases to 40%. The average real (9.84) and imaginary (2.06) permittivity further increase when the normalized weight fraction of $ZrB_2$ nano particles increase to 45%. However, the average imaginary permittivity (0.90) of the 50% sample drops because the microwave shows mainly surface reflection in the sample. This speculation can be verified by the change of the loss tangent as a function of the normalized weight fraction of $ZrB_2$ nano particles (FIG. 6C). The loss tangent first increases and then decreases with the increase of the normalized weight fraction of $ZrB_2$ nano particles. The nano composites with lower normalized weight fractions of $ZrB_2$ nano particles (below 30%) show no evident loss when interacting with the microwave. Samples with high normalized weight fractions of $ZrB_2$ nano particles such as 45% and 50% also show unsatisfactory loss tangent. The maximum loss tangent was obtained when the normalized weight fractions of $ZrB_2$ nano particles are within 30-40%, indicating that the nano composites are subject to the most material loss within this range.

The microwave absorption property of the PDC-UHTC nanocomposites is evaluated by the reflection coefficient (RC) calculated by the following Equation (2.3)[30, 33, 66-69] using the complex relative permittivity based on the generalized transmission line theory and the metal back plane model:

$$R_L = 20\log\left|\frac{Z_{in}-1}{Z_{in}+1}\right| \quad (2)$$

$$Z_{in} = \sqrt{\frac{\mu_r}{\varepsilon_r}} \tanh\left[j\frac{2\pi}{c}\sqrt{\mu_r\varepsilon_r}\,fd\right] \quad (3)$$

where $R_L$ is the reflection of the composites, c is light velocity in the vacuum, f is frequency, $Z_{in}$ is the normalized input impedance, $\varepsilon_r$ and $\mu_r$ are relative permittivity and permeability of materials, respectively. The RC of the PDC-UHTC nanocomposites with various normalized weight fractions of $ZrB_2$ nano particles are shown in FIG. 6E. The RC of the nano composites with low normalized weight fractions of $ZrB_2$ nano particles (1-25%) and high normalized weight fractions of $ZrB_2$ nano particles (45% and 50%) are high, suggesting an undesired microwave absorption property. The nano composites show the best absorption when the normalized weight fractions of $ZrB_2$ nano particles are in the range of 30-40%. The maximum absorption of the composites appears when the normalized weight fraction of $ZrB_2$ nano particles is 32.5%, with 99.88% microwave absorption (~-29.3 dB) at 29.47 GHz. The nano composites achieve a full Ka-band absorption (band width, lower than -10 dB or higher than 90% absorption) when the normalized weight fraction of $ZrB_2$ nano particles reaches 40%. Impedance matching between the free space and the sample surface as well as attenuation by the absorber determine the microwave absorption properties of the nano composites. FIG. 6D shows the calculated modulus of $Z_{in}-1(|Z_{in}-1|)$ of the samples. The value of $|Z_n-1|$ approaches zero represents a smaller reflection on the sample surface. For the nano composites with low normalized weight fractions of $ZrB_2$ nano particles (1-25%), the impedance is matched well, which means more microwave may enter into the materials and be dissipated by the absorbers. On the other hand, larger values of $|Z_{in}-1|$ (such as for 45% and 50% samples) cause a strong reflection on the front surface of the absorber. The impedance is better matched when the normalized weight fractions of $ZrB_2$ nano particles are in the range of 30-40%. After entering the materials, the conduction loss (determined by the conductivity of the nano composites) and dielectric loss together determine the microwave absorption of the nano composites.[70] The imaginary permittivity of the nano composites can be described by the following Equation (4):[71]

$$\varepsilon'' = \frac{\varepsilon_s - \varepsilon_\infty}{1+(\omega\tau)^2}\omega\tau + \frac{\sigma}{2\pi\varepsilon_0 f} \quad (4)$$

The first part is the polarization loss of the nano composites, and the second part is the electrical conductive loss of the nano composites. The electrical conductivity should be adjusted. Too small conductivity cannot contribute to significant conduction loss, while too large conductivity causes large permittivity of the materials and contribute to no significant absorption of the microwave.

For dielectric ceramics, the conduction loss contributes to a large portion from total loss, and the imaginary part can be expressed by Equation (5):[30]

$$\varepsilon'' \approx \frac{\sigma}{2\pi\varepsilon_0 f} \quad (5)$$

However, the polarization loss is also important for the nano composites. According to the Debye relaxation process, the relationship between the real part and the imaginary part of the permittivity can be described as:[72-75]

$$\left(\varepsilon' - \frac{\varepsilon_s+\varepsilon_\infty}{2}\right)^2 + (\varepsilon'')^2 = \left(\frac{\varepsilon_s-\varepsilon_\infty}{2}\right)^2 \quad (6)$$

The plot of the real part and the imaginary part of the permittivity will be a semicircle (Cole-Cole semicircle). Each semicircle is related to one Debye relaxation process. FIG. 7A-7D shows the relationship between the imaginary part and the real part of the permittivity of the PDC with various normalized weight fractions of $ZrB_2$ nano particles. As seen from FIG. 7A-7E, the PDC with normalized weight fractions of $ZrB_2$ nano particles (10-40%) exhibit more obvious Cole-Cole semicircles compared with the PDC with normalized weight fraction of $ZrB_2$ nano particles at 0%. Three semicircles exist for the PDC with normalized weight fractions of $ZrB_2$ nano particles (10-15%) (FIG. 7B), which can be attributed to the interfacial polarization induced by the interfaces between of $ZrB_2$ nano particles and the PDC matrix, nano $ZrO_2$ and the PDC matrix as well as $ZrB_2$ nano particles and nano $ZrO_2$.[72-76] With increase of the normalized weight fraction of $ZrB_2$ nano particles, the conductance loss (related to the electron polarization because of its very high carrier mobility)[75, 77] becomes significantly important for the nano composites, as seen from the PDC with normalized weight fractions of $ZrB_2$ nano particles (30-40%) (FIG. 7C, 7D) showing two semicircles and the PDC with normalized weight fractions of $ZrB_2$ nano particles (45-

50%) (FIG. 7D) showing almost linear relationship between the imaginary part and real part of the permittivity.

Figures 7A, 7B, 7C, 7D, 7E:
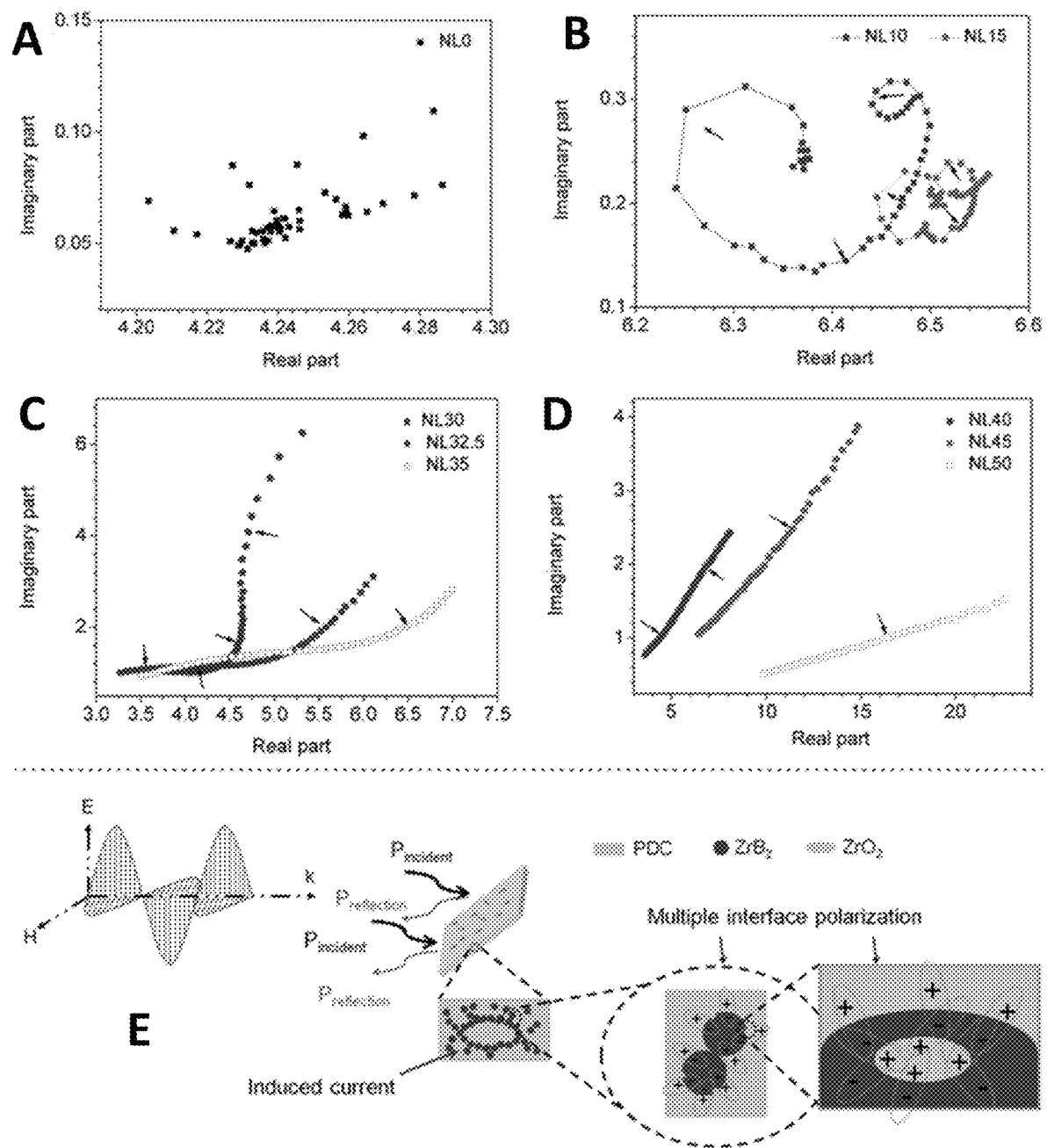
FIGS. 7A-7E illustrate the relationship between imaginary part and real part of permittivity the PDC with various normalized weight fractions of $ZrB_2$ nano particles (FIG. 7A-D). Schematic for the microwave absorption mechanism of the novel nano composites (FIG. 7E). The arrows shown in FIG. 7A-D point out the cole-cole semicircles in the plot of real part and imaginary part of the permittivity.

The current conduction circuits will be induced when the microwave enters into the materials, as illustrated in FIG. 7E. The conduction in these circuits will cause energy loss of microwave and convert it into thermal energy. In this work, the nano composites with the normalized weight fractions of $ZrB_2$ nano particles from 30% to 40% show better impedance match and sufficient conduction loss. Besides the electrical conduction loss, the dielectric loss also plays an important part in dissipating the microwave. For the fabricated nano composites, a large number of interfaces by the $ZrB_2$ nano particles and the nano $ZrO_2$ were introduced, which induces the dielectric loss. As illustrated in FIG. 7E, the space carriers accumulate on these interfaces, not only between the PDC matrix and the $ZrB_2$ nano particles, but also between the nano $ZrO_2$ and the $ZrB_2$ nano particles, forming a large number of dipoles. These dipoles rotate with the microwave, causing evident polarization loss in the nano composites.

Although the conductive loss is increased with the normalized weight fraction of $ZrB_2$ nano particles increase, the maximum absorption was not acquired when the normalized weight fraction of $ZrB_2$ nano particles increases to be 50%, because of the mismatched impedance.

Proper porosity is advantageous to the microwave absorption of the nano-composites, the relationship between the porosity and loss tangent can be described by the following Equation (7):[30]

$$\tan \delta = (1-P)\tan \delta_0 + P(AP^{n-1}) \quad (7)$$

where $\tan \delta_0$ is the loss tangent of the fully dense material, n is a constant larger than 1, P is the volume fraction of pores, and A is a constant coefficient. For the nano composites, the porosity reaches a minimum value when the normalized weight fractions of $ZrB_2$ nano particles are within the range of 30-40%. Therefore, the excellent microwave absorption properties of the nano composites (the normalized weight fractions of $ZrB_2$ nano particles from 30% to 40%) are not induced by the porosity change.

Thickness is an important factor to be considered especially in aerospace applications. It should be kept as thin as possible. The effect of thickness on the microwave absorption property is shown in FIG. 8A-8E. For the nano composite sample NL40, the maximum absorption and largest bandwidth are all obtained at a small thickness of around 3 mm (RC −28.27 dB at 37.03 GHz). The RC of NL30 is −28.40 dB at a thickness of 1.16 mm and 26.77 GHz. The RC of NL32.5 is −29.30 dB at a thickness of 1.26 mm and 29.47 GHz. These features make the nano composites have the potential application for light materials for aerospace application.

Figures 8A, 8B, 8C, 8D, 8E:
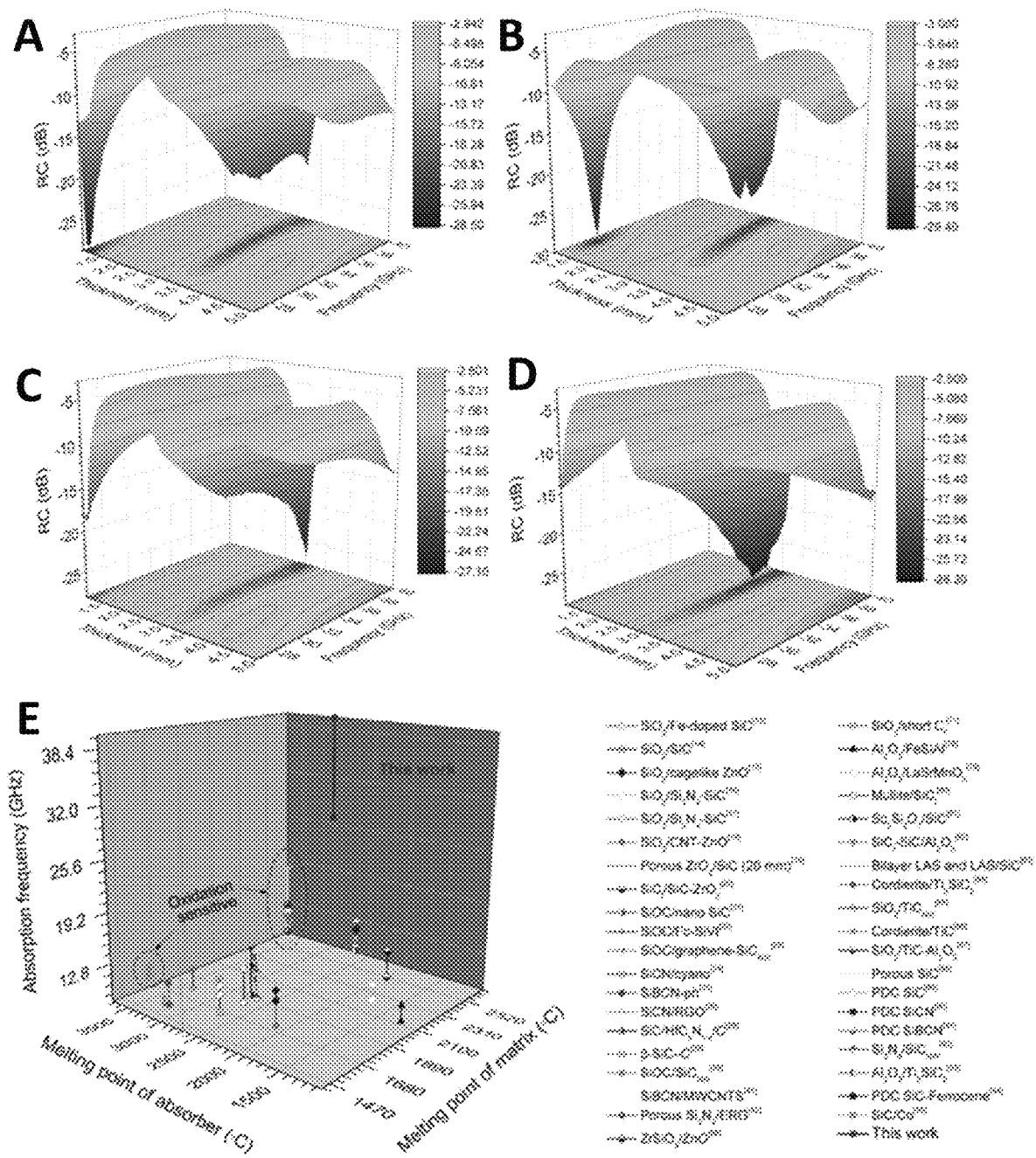
FIGS. 8A-8E illustrate the effect of thickness on the EM absorption property of samples NL30 (FIG. 8A), NL32.5 (FIG. 8B), NL35 (FIG. 8C) and NL40 FIG. 8(D).

FIG. 8E summarizes the microwave absorption bandwidth of typical ceramic-based composites reported in recent literature. It can be seen that the nano composites show a significantly broad bandwidth of 13.5 GHz compared with other ceramic-based composites, such as oxide-based, PDC-based and other ceramic based composites. Besides, the excellent microwave absorption property of the nano composites is obtained under a much higher frequency band than other ceramic-based composites. This feature makes the nano composites a potential structure material for high frequency applications. Also, due to the higher melting points and good oxidation resistance of nano $ZrB_2$—$ZrO_2$ absorbers as well as the high melting point of the PDC matrix, the nano composites show bright prospect for the bandwidth absorption materials in high temperature harsh environment.

CONCLUSION

The present disclosure provides a novel high temperature microwave absorbing ceramic composite. The polymer derived ceramic (PDC) is the matrix, while partially surface-oxidized nano $ZrB_2$ particles work as microwave absorbers. Electrical, dielectric and microwave absorption properties of the nano composites with the normalized weight fractions of $ZrB_2$ nano particles from 1% to 50% were systemically investigated. The fabricated nano composite with the normalized weight fraction of $ZrB_2$ nano particles at 40% has a significantly wide microwave absorption bandwidth of 13.5 GHz, covering the whole Ka-band. The maximum absorption was −29.30 dB at 29.47 GHz with a small thickness of 1.26 mm. Extensive nano interfaces introduced in the nano composites and the electrical conduction loss provided by the partially surface-oxidized nano $ZrB_2$ lead to superior microwave absorption. The DC conductivity of the nano composites showed evidently percolation phenomenon as the normalized weight fraction of $ZrB_2$ nano particles increase to 30.49%, obtained from the fitted percolation curve. The excellent microwave absorption properties make the nano composites an ideal microwave absorption material choice for high-temperature harsh environment applications.

Experimental Section

Fabrication of the PDC-Nano $ZrB_2$ Composites.

The matrix used in this work is one kind of polymer-derived ceramics (PDCs), which is synthesized by thermal decomposition of polycarbosiloxane (purchased from Extreme Environment Materials Solutions, LLC), instead of by sintering ceramic powder compacts. The UHTCs used were $ZrB_2$ nano powders with an average diameter of 43 nm, purchased from US Research Nanomaterials, Inc. The PDC-nano $ZrB_2$ composites were fabricated by the following basic steps of the technique, including: (1) mixing a specific weight fractions of the $ZrB_2$ nano powders in the liquid PDC precursor, (2) dispersing the $ZrB_2$ nano powders in the liquid PDC precursor under electromagnetic stirring, (3) curing and cross-linking the mixture into solid state at temperature 110-200° C., (4) crushing the cured bulk into powders and milling to reduce the particle size to be ~1 μm in a High-Energy Ball Mill (8000D Mixer/Mill) for 90 min, (5) press the powders into disk samples with diameter 15 mm under uniaxial pressure of 700 Psi, and (6) the compacts were finally pyrolyzed at 1000° C. for 3 hrs in a quartz tube furnace under a steady flow of ultrahigh purity Ar with a heating rate of 1° C./min to obtain the final nano composite. The vacuum pressure within the quartz tube was 5 kPa before introducing the Ar flow.

Characterization.

The relative complex permittivity of samples was measured through the waveguide method according to ASTM D 5568-08. The measurement setup consisted of a vector network analyzer (Keysight, N5225A PNA, 10 MHz to 50 GHz), waveguide cavity, and sample holder. A set of calibration kits was used to calibrate the measurement system. The microwave scattering parameters were directly measured by the PNA, and the permittivity of samples was calculated according to the NRW algorithm. The relative complex permittivity of samples with dimensions of 7.112 mm×3.556 mm×3.018 mm was measured in the frequency range of 26.5-40 GHz (Ka-band). The sample surface was polished before measurement.

For conductivity measurement, the surface of the discs was polished to 1 μm finish. The DC (direct current) conductivities of the ceramic samples were measured by the I-V curve on Keithley 6514 series multimeter (Tektronix, Inc. Beaverton, USA) at room temperature. Carbon paint (SPI, West Chester, Pennsylvania, USA) was then pasted on the surfaces as the electrodes.

The microstructure of the nano composites was characterized by Raman spectroscopy, X-Ray Diffraction (XRD), field emission scanning electron microscope (SEM, FEI Verios 460L) and Transmission electron microscopy (TEM). Raman spectra were obtained on LabRAM HR Raman microscopes (HORIBA Scientific) with the 442 nm line of $Ar^+$ laser as the excitation source. XRD data were acquired using a Malvern PANalytical Empyrean X-ray diffractometer with Cu K-alpha radiation (wavelength 0.15418 nm) in a 2 theta range of 10 to 80 degree. The step size and time per step used in these measurements are 0.026 degree and 87 sec/step, respectively.

TEM observation was performed using a Talos F200X G2 (USA) microscope operated at 200 KeV. TEM samples were prepared with Focused Ion Beam (FIB) milling by FEI Quanta 3D FEG (USA).

The chemical state of the elements in the nano composites was evaluated by X-ray photoelectric spectroscopy (SPECS FlexMod XPS with Hemispherical analyzer PHOIBIS 150) with Mg kα excitation (1254 eV). Base pressure in the analysis chamber is in 10-10 mbar range. X-Ray incidence angle is ~30° from surface and x-ray source to analyzer ~60°. Energy calibration was established by referencing to adventitious carbon (CIs line at 285.0 eV binding energy). High-temperature in-situ XRD analysis of the pressed (700 Psi at room temperature) nano $ZrB_2$ pellet and the PDC with normalized weight fraction of $ZrB_2$ nano particles at 40% was conducted in He up to 1000° C.

REFERENCES

[1] F. Shahzad, M. Alhabeb, C. B. Hatter, B. Anasori, S. M. Hong, C. M. Koo, Y. Gogotsi, *Science* 2016, 6304, 1137.
[2] Y. Zhang, Y. Huang, T. F. Zhang, H. C. Chang, P. S. Xiao, H. H. Chen, Z. Y. Huang, Y. S Chen, *Adv. Mater.* 2015, 27, 2049.
[3] T. Xia, C. Zhang, N. A. Oyler, X. B. Chen, *Adv. Mater.* 2013, 25, 6905.
[4] Y. Li, X. F. Liu, X. Y. Nie, W. W. Yang, Y. D. Wang, R. H. Yu, J. L. Shui, *Adv. Funct. Mater.* 2019, 29, 1807624.
[5] Y. Hou, L. F. Cheng, Y. N. Zhang, Y. Yang, C. R. Deng, Z. H. Yang, Q. Chen, X. Q. Du, C. Zhao, L. X. Zheng, *ACS Appl. Mater. Interfaces* 2018, 10, 29876.
[6] X. L. Li; X. W. Yin, H. L. Xu, M. K. Han, M. H. Li, S. Liang, L. F. Cheng, L. T. Zhang, *ACS Appl. Mater. Interfaces* 2018, 10, 34524.
[7] L. W. Yan, C. Q. Hong, B. Q. Sun, G. D. Zhao, Y. H. Cheng, S. Dong, D. Y. Zhang, X. H. Zhang, *ACS Appl. Mater. Interfaces* 2017, 9, 6320.
[8] P. Wang, L. F. Cheng, Y. N. Zhang, L. T. Zhang, *ACS Appl. Mater. Interfaces* 2017, 9, 28844.
[9] M. K. Han, X. W. Yin, H. Wu, Z. X. Hou, C. Q. Song, X. L. Li, L. T. Zhang, L. F. Cheng, *ACS Appl. Mater. Interfaces* 2016, 8, 21011.
[10] J. H. Chen, M. Liu, T. Yang, F. M. Zhai, X. M. Hou, K. C. Chou, *Cryst Eng Comm* 2017, 19, 519.
[11] Z. M. Li, Z. Yang, M. L. Zhang, Y. X. Yan, Y. X. Huang, Y. Hao, *Ceram. Int.* 2017, 43, 222.
[12] Y. M. Shi, F. Luo, Y. Liu, W. C. Zhou, X. H. Zhang, *Int. J. Appl. Ceram. Technol.* 2015, 12, E172.
[13] X. Y. Yuan, L. F. Cheng, Y. J. Zhang, S. W. Guo, L. T. Zhang, *Mater. Design* 2016, 92, 563.
[14] X. Y. Yuan, L. F. Cheng, L. T. Zhang, *J. Alloy. Compd.* 2016, 680, 604.
[15] M. S. Cao, X. L. Shi, X. Y. Fang, H. B. Jin, Z. L. Hou, W. Zhou, Y. J. Chen, *Appl. Phys. Lett.* 2007, 91, 203110.
[16] G. P. Zheng, X. W. Yin, S. H. Liu, X. M. Liu, J. L. Deng, Q. Li, *J. Eur. Ceram. Soc.* 2013, 33, 2173.
[17] M. Li, X. W. Yin, G. O. Zheng, M. Chen, M. J. Tao, L. F. Cheng, L. T. Zhang, *J Mater. Sci.* 2015, 50, 1478.
[18] Y. Liu, X. W. Yin, L. Kong, X. M. Liu, F. Ye, L. T. Zhang, L. F. Cheng, *Carbon* 2013, 64, 537.
[19] X. W. Yin, Y. Y. Xue, L. T. Zhang, L. F. Cheng, *Ceram. Int.* 2012, 38, 2421.
[20] Y. M. Shi, F. Luo, D. H. Ding, J. Gui, W. C. Zhou, D. M. Zhu, *Phys. Status Solid A* 2013, 210, 2668.
[21] W. Y. Duan, X. W. Yin, F. Ye, Q. Li, M. K. Han, X. F. Liu, Y. Z. Cai, *J. Mater. Chem. C* 2016, 4, 5962.
[22] W. Y. Duan, X. W Yin, C. J Luo, J. Kong, F. Ye, H. X. Pan, *J. Eur. Ceram. Soc.* 2017, 37, 2021.
[23] M. K. Han, X. W. Yin, W. Y. Duan, S. Ren, L. T. Zhang, L. F. Cheng, *J. Eur. Ceram. Soc.* 2016, 36, 2695.
[24] Y. Song, L. H He, X. F. Zhang, F. Liu, N. Tian, Y. S. Tang, J. Kong, *J. Phys. Chem. C* 2017, 121, 24774.
[25] C. J Luo, Y. S. Tang, T. Jiao, J. Kong, *ACS Appl. Mater. Interfaces* 2018, 10, 28051.
[26] X. M. Liu, Z. J. Yu, R. Ishikawa, L. Q. Chen, X. W. Yin, Y. C. Ikuharad, R. Riedel, *J Mater. Chem. C* 2017, 5, 7950.
[27] F. Ye, L. T. Zhang, X. W. Yin, Y. J. Zhang, L. Kong, Y. S. Liu, L. F. Cheng, *J Eur. Ceram. Soc.* 2014, 34, 205.
[28] Q. B. Wen, Y. Feng, Z. J. Yu, D. L. Peng, N. Nicoloso, E. Ionescu, R. Riedel, *J Am. Ceram. Soc.* 2016, 99, 2655.
[29] Z. H. Zhou, Z. H. Wang, Y. Yi, S. Q. Jiang, G. Wang, *Mater. Lett.* 2013, 112, 66.
[30] X. W. Yin, L. Kong, L. T. Zhang, L. F. Cheng, N. Travitzky, P. Greil, *Int. Mater. Rev.* 2014, 59, 326.
[31] F. Ye, L. T. Zhang, X. W. Yin, X. Z. Zuo, Y. S. Liu, L. F. Cheng, *J. Eur. Ceram. Soc.* 2012, 32, 4025.
[32] X. M. Li, L. T. Zhang, X. W. Yin, L. Y. Feng, Q. Li, *Scripta Mater.* 2010, 63, 657.
[33] Z. R. Jia, D. Lan, K. J. Lin, M. Qin, K. C. Kou, G. L. Wu, H. J. Wu, *J. Mater. Sci.-Mater. El.* 2018, 29, 17122.
[34] L. An, W. Xu, S. Rajagopalan, C. Wang, H. Wang, Y. Fan, L. Zhang, D. Jiang, J. Kapat, L. Chow, B. Guo, J. Liang, R. Vaidyanathan, *Adv. Mater.* 2004, 16, 2036.
[35] J. S. Yang, Sprengard, L. C. Ju, A. Hao, M. Saei, R. Liang, G. J. Cheng, C. Y. Xu, *Carbon* 2016, 108, 38.
[36] J. S. Yang, R. Downes, A. Schrand, J. G. Park, R. Liang, C. Y. Xu, *Scripta Mater.* 2016, 124, 21.
[37] R. Riedel, A. Kienzle, W. Dressler, L. Ruwisch, J. Bill, F. Aldinger, *Nature* 1996, 382, 796.
[38] J. S. Yang, S. M. Dong, C. Y. Xu, *Ceram. Int.* 2016, 42, 3019.
[39] W. Y. Duan, X. W. Yin, Q. Li, X. M. Liu, L. F. Cheng, L. T. Zhang, *J. Eur. Ceram. Soc.* 2014, 34, 257.
[40] R. C. Che, L. M. Peng, X. F. Duan, Q. Chen, X. L. Liang, *Adv. Mater.* 2004, 16, 401.
[41] Y. J. Zhang, X. W. Yin, F. Ye, L. Kong, *J. Eur. Ceram. Soc.* 2014, 34, 1053.
[42] F. Ye, Q. Song, Z. C. Zhang, W. Li, S. Y. Zhang, X. W. Yin, Y. Z. Zhou, H. W. Tao, Y. S. Liu, L. F. Cheng, L. T. Zhang, H. J. Li, *Adv. Funct. Mater.* 2018, 28, 1707205.

[43] Z. Y. Huang, H. H. Chen, Y. Huang, Z. Ge, Y. Zhou, Y. Yang, P. S. Xiao, J. J. Liang, T. F. Zhang, Q. Shi, G. H. Li, Y. S. Chen. *Adv. Funct. Mater.* 2018, 28, 1704363.

[44] W. T. Cao, F. F. Chen, Y. J. Zhu, Y. G. Zhang, Y. Y. Jiang, M. G. Ma, F. Chen, *ACS Nano* 2018, 12, 4583.

[45] S. Zhao, H. B. Zhang, J. Q. Luo, Q. W. Wang, B. Xu, S. Hong, Z. Z. Yu, *ACS Nano* 2018, 12, 11193.

[46] Q. H. Liu, Q. Cao, H. Bi, C. Y. Liang, K. P. Yuan, W. She, Y. J. Yang, R. C. Che, *Adv. Mater.* 2016, 28, 486.

[47] X. J. Zhang, J. Q. Zhu, P. G. Yin, A. P. Guo, A. P. Huang, L. Guo, G. S. Wang, *Adv. Funct. Mater.* 2018, 28, 1800761.

[48] Z. C. Wu, K. Pei, L. S. Xing, X. F. Yu, W. B. You, R. C. Che, *Adv. Funct. Mater.* 2019, 29, 1901448.

[49] W. G. Fahrenholtz, G. E. Hilmas, *Scripta Mater.* 2017, 129, 94.

[50] W. G. Fahrenholtz, G. E. Hilmas, *Int. Mater. Rev.* 2012, 57, 61.

[51] X. H. Zhang, P. Hu, J. C. Han, S. H. Meng, *Compos. Sci. Technol.* 2008, 68, 1718.

[52] C. Linck, E. Ionescu, B. Papendorf, D. Galuskova, D. Galusek, P. Sajgalik, R. Riedel, *Int. J. Mater. Res.* 2012, 103, 31.

[53] J. Yuan, M. Galetz, X. G. Luan, C. Fasel, R. Riedel, E. Ionescu, *J. Eur. Ceram. Soc.* 2016, 36, 3021.

[54] B. Papendorf, E. Ionescu, H. J. Kleebe, C. Linck, O. Guillon, K. Nonnenmacher, R. Riedel, *J. Am. Ceram. Soc.* 2013, 96, 272.

[55] M. Thompson, W. G. Fahrenholtz, G. Hilmas, *J. Am. Ceram. Soc.* 2011, 94, 429.

[56] G. H. Zhao, X. H. Zhang, Z. J. Shen, D. J. Zhang, C. Q. Hong, J. X. Li, Z. Zhang, *J Am. Ceram. Soc.* 2014, 97, 2360.

[57] E. Beche, M. Balat-Pichelin, V. Flaud, J. Esvan, T. Duguet, D. Scitie, D. Alfano, *Surf Interface Anal.* 2014, 46, 817.

[58] V. Zamora, A. L. Ortiz, F. Guiberteau, M. Nygren, *J. Alloy. Compd.* 2012, 518, 38.

[59] P. Colombo, G. Mera, R. Riedel, G. D. Soraru, *J. Am. Ceram. Soc.* 2010, 93, 1805.

[60] C. Stabler, E. Ionescu, M. Graczyk-Zajac, I. Gonzalo-Juan, R. Riedel, *J. Am. Ceram. Soc.* 2018, 101, 4817.

[61] S. B. Tu, Q. Jiang, X. X, Zhang, H. N. Alshareef, *ACS Nano* 2018, 12, 3369.

[62] D. S. McLachlan, M. Blaszkiewics, R. E. Newnham, *J. Am. Ceram. Soc.* 1990, 73, 2187.

[63] J. J. Wu, D. S. McLachlan, *Phys. Rev. B* 1997, 56, 1236.

[64] D. S. McLachlan, C. Chiteme, C. Park, K. E. Wise, S. E. Lowther, P. T. Lillehei, E. J. Siochi, J. S. Harrison, *J Polym. Sci. Pol. Phys.* 2005, 43, 3273.

[65] D. S. McLachlan, T. B. Doyle, G. Sauti, *J. Magn. Magn. Mater.* 2018, 458, 365.

[66] L. Kong, X. W. Yin, L. T. Zhang, L. F. Cheng, *J. Am. Ceram. Soc.* 2012, 95, 3158.

[67] D. Micheli, C. Apollo, R. Pastore, M. Marchetti, *Compos. Sci. Technol.* 2010, 70, 400.

[68] G. Z. Wang, Z. Gao, S. W. Tang, C. Q. Chen, F. F. Duan, S. C. Zhao, S. W. Lin, Y. L. Feng, L. Zhou, Y. Qin, *ACS Nano* 2012, 6, 11009.

[69] H. Sun, R. C. Che, X. You, Y. S. Jiang, Z. B. Yang, J. Deng, L. B. Qiu, H. S. Peng, *Adv. Mater.* 2014, 26, 8120.

[70] B. Quan, W. H. Shi, S. J. H. Ong, X. C. Lu, P. L. Wang, G. B. Ji, Y. F. Guo, L. R. Zheng, Z. C. J. Xu, *Adv. Funct. Mater.* 2019, 29, 1901236.

[71] M. S. Cao, W. L. Song, Z. L. Hou, B. Wen, J. Yuan, *Carbon* 2010, 48, 788.

[72] B. Quan, X. H. Liang, G. B. Ji, Y. Cheng, W. Liu, J. N. Ma, Y. N. Zhang, D. R. Li, G. Y. Xu, *J. Alloy. Compd.* 2017, 728, 1065.

[73] L. Kong, X. W. Yin, X. Y. Yuan, Y. J. Zhang, X. M. Liu, L. F. Cheng, L. T. Zhang, *Carbon* 2014, 73, 185.

[74] L. C. Ding, A. B. Zhang, H. L. Lu, Y. P. Zhang, Y. P. Zheng, *RSC Adv.* 2015, 5, 83953.

[75] H. L. Yu, T. S. Wang, B. Wen, M. M. Lu, Z. Xu, C. L. Zhu, Y. J. Chen, X. Y. Xue, C. W. Sun, M. S. Cao, *J. Mater. Chem.* 2012, 22, 21679.

[76] Z. C. Shi, S. G. Chen, R. H. Fan, X. A. Wang, X. Wang, Z. D. Zhang, K. Sun, *J. Mater. Chem. C* 2014, 2, 6752.

[77] K. S. Novoselov, A. K Geim, S. V Morozov, D. Jiang, Y. Zhang, S. V. Dubonos, I. V. Grigorieva, A. A. Firsov, *Science* 2004, 306, 666.

[78] L. Zhou, J. L. Huang, X. G. Wang, G. X. Su, J. Y. Qiu, Y. L. Dong, *J. Alloy. Compd.* 2019, 774, 813.

[79] Z. N. Yang, F. Luo, J. S. Xu, W. C. Zhou, D. M. Zhu, *J. Alloy. Compd.* 2016, 662, 607.

[80] H. Gao, F. Luo, Q. L. Wen, Y. C. Qing, W. C. Zhou, *Ceram. Int.* 2019, 45, 11625.

[81] H. J. Wei, X. W. Yin, Z. X. Hou, F. R. Jiang, H. L. Xu, M. H. Li, L. T. Zhang, L. F. Cheng, *J. Eur. Ceram. Soc.* 2018, 38, 4189.

[82] Y. Mu, W. C. Zhou, Y. Hu, H. Y. Wang, F. Luo, D. H. Ding, Y. C. Qing, *J. Eur. Ceram. Soc.* 2015, 35, 2991.

[83] F. Luo, D. M. Zhu, W. C. Zhou, *Ceram. Int.* 2007, 33, 197.

[84] Y. Liu, F. Luo, J. B. Su, W. C. Zhou, D. G. Zhu, Z. M. Li, *J. Alloy. Compd.* 2015, 619, 854.

[85] X. Y. Yuan, L. F. Cheng, L. T. Zhang, *Ceram. Int.* 2014, 40, 15391.

[86] Y. Liu, Y. Y. Li, Fa Luo, X. L. Su, J. Xu, J. B. Wang, Y. H. Qu, Y. M. Shi, *J Mater. Sci.: Mater. Electron.* 2017, 28, 12115.

[87] Y. Wang, F. Luo, W. C Zhou, D. M. Zhu, *J Electron. Mater.* 2017, 46, 5225.

[88] S. Dong, X. H. Zhang, D. Y. Zhang, B. Q. Sun, L. W. Yan, X. G. Luo, *J. Eur. Ceram. Soc.* 2018, 38, 29.

[89] Q. Li, X. W. Yin, W. Y. Duan, L. Kong, B. L. Hao, F. Ye, *J. Alloy. Compd.* 2013, 565, 66.

[90] Q. Li, X. W. Yin, W. Y. Duan, B. L. Hao, L. Kong, X. M. Liu, *J Eur. Ceram. Soc.* 2014, 34, 589.

[91] F. Ye, L. T. Zhang, X. W. Yin, Y. J. Zhang, L. Kong, Q. Li, Y. S. Liu, L. F. Cheng, *J. Eur. Ceram. Soc.* 2013, 33, 1469.

[92] W. Y. Duan, X. W. Yin, F. X. Cao, Y. L. Jia, Y. Xie, P. Greil, N. Travitzky, *Mater. Lett.* 2015, 159, 257.

[93] Y. Liu, F. Luo, J. B. Su, W. C. Zhou, D. M. Zhu, *J. Electron. Mater.* 2015, 44, 867.

[94] Q. Li, X. W. Yin, W. Y. Duan, L. Kong, X. M. Liu, L. F. Cheng, L. T. Zhang, *J. Eur. Ceram. Soc.* 2014, 34, 2187.

[95] C. J. Luo, W. Y. Duan, X. W. Yin, J. Kong, *J. Phys. Chem. C* 2016, 120, 18721.

It should be emphasized that the above-described embodiments of this disclosure are merely possible examples of implementations, and are set forth for a clear understanding of the principles of this disclosure. Many variations and modifications may be made to the above-described embodiments of this disclosure without departing substantially from the spirit and principles of this disclosure. All such modifications and variations are intended to be included herein within the scope of this disclosure and protected by the following claims.

I claim:

1. A ceramic composite material comprising:
   a matrix comprising a polymer-derived ceramic;
   one or more of substrates selected from: an ultra-high temperature ceramic (UHTC), an electrically-conductive material, magnetic-conductive material, and a combination of these.

2. The ceramic composite material of claim 1, wherein the solid substrate is selected from a particle, a fiber, a whisker, a flake, a mat, or a plate.

3. The ceramic composite material of claim 1, wherein the substrate is the electrically-conductive material, wherein the electrically-conductive material is selected from copper, aluminum, magnesium, silver, gold, molybdenum, zinc, lithium, brass, platinum, tungsten, tin, lead, or titanium.

4. The ceramic composite material of claim 1, wherein the substrate is the magnetic-conductive material, wherein the magnetic-conductive material is selected from iron, steel, nickel, cobalt, or a rare earth metal.

5. The ceramic composite material of claim 1, wherein the substrate is the ultra-high temperature ceramic substrate, wherein the ultra-high temperature ceramic substrates comprise a boride, a carbide, or a nitride.

6. The ceramic composite material of claim 1, wherein the substrate is the ultra-high temperature ceramic substrate, wherein the ultra-high temperature ceramic substrates comprise $HfB_2$, $ZrB_2$, $TiB_2$, $NbB_2$, $TaB_2$, or a combination thereof.

7. The ceramic composite material of claim 1, wherein the substrate is the ultra-high temperature ceramic substrate wherein the ultra-high temperature ceramic substrates comprise TaC, HfC, ZrC, NbC, TiC, or a combination thereof.

8. The ceramic composite material of claim 1, wherein the substrate is the ultra-high temperature ceramic substrate, wherein the ultra-high temperature ceramic substrates comprise TaN, HfN, TiN, ZrN, NbN, or a combination thereof.

9. The ceramic composite material of claim 1, wherein the substrate is the ultra-high temperature ceramic substrate, wherein the ultra-high temperature ceramic substrates comprise $ZrB_2$, where the ultra-high temperature ceramic substrate has a $ZrO_2$ coating.

10. The ceramic composite material of claim 1, wherein the substrate is the ultra-high temperature ceramic substrate, wherein the ultra-high temperature ceramic substrates comprise $TfB_2$, where the ultra-high temperature ceramic substrate has a $TfO_2$ coating.

11. The ceramic composite material of claim 1, wherein the polymer-derived ceramic $SbN_4$, SiC, BN, AlN, SiCN, SiCO, BCN, SiCNO, SiBCN, SiBCO, SiAlCN, SiAlCO, or a combination thereof.

12. The ceramic composite material of claim 1, wherein the normalized weight of one or more substrates is about 10-70% of the total weight of the ceramic composite material.

13. The ceramic composite material of claim 1, wherein the ceramic composite material has a microwave absorption bandwidth, wherein the microwave absorption bandwidth is S-band C-band, X-band, Ku-band, K-band, Ka-band, V-band, W-band.

14. A method of forming a ceramic composite comprising:
   a) providing a mixture comprising:
      1) A liquid preceramic precursor, and
      2) One or more substrates, wherein the one or more substrates is selected from a solid substrate, a liquid substrate, or both the solid substrate and the liquid substrate, wherein the solid substrates and liquid substrates are independently selected from the group consisting of: an ultra-high temperature ceramic (UHTC), carbon, an electrically-conductive material, magnetic-conductive material, and a combination of these,
   b) heating the mixture at a temperature for a time effective to cure the liquid preceramic precursor to form a solid mixture;
   c) subjecting the solid mixture to one or more forces to form particles of the solid mixture;
   d) pressing the particles of the solid mixture into a mold having a pre-selected shape to form compacts of the solid mixture; and
   e) pyrolyzing the solid mixture in step (b) or the compacts in step (d) or both at a temperature for a time effective to form the ceramic composite material.

15. The method of claim 14, wherein the liquid preceramic precursor comprises an organosilicon polymer, wherein the organosilicon polymer is selected from the group consisting of: polysilanes, polycarbosilanes, polysilazanes, polysiloxanes, polycarbosilanes, polycarbosiloxanes, polysilylcarbodiimides, and a combination thereof.

16. The method of claim 14, wherein pyrolyzing is at about 400-2000° C.

17. The method of claim 14, wherein the mixture is heated at about 100-400° C.

18. The method of claim 14, wherein the subjecting of the solid mixture to one or more forces comprises compressing the solid mixture, grinding the solid mixture, or a combination thereof.

19. The method of claim 14, wherein the solid substrate is selected from a particle, a fiber, a whisker, a flake, a mat, or a plate and wherein the liquid substrate is selected from a precursor liquid, a gel, or a paste.

20. The ceramic composite material of claim 1, further comprising an oxide on surface of at least one of the substrates, wherein the oxide is derived from the aforementioned substrates.

* * * * *